United States Patent [19]

Oe

[11] Patent Number: 5,056,524
[45] Date of Patent: Oct. 15, 1991

[54] IMAGE PROCESSING METHOD AND SYSTEM FOR RADIOLOGICAL DIAGNOSTICS

[75] Inventor: Mitsuo Oe, Ootawara, Japan

[73] Assignee: Kabushiki Kaisha Toshiba, Kawasaki, Japan

[21] Appl. No.: 425,300

[22] Filed: Oct. 23, 1989

[30] Foreign Application Priority Data

Oct. 25, 1988 [JP] Japan .................................. 63-268857

[51] Int. Cl.$^5$ ................................................. A61B 6/00
[52] U.S. Cl. ...................................... 128/654; 378/99; 358/111; 364/413.23; 128/653 R
[58] Field of Search .................... 128/653 R, 654, 659, 128/695, 713; 378/99; 358/111; 364/414.23; 382/6, 22

[56] References Cited

U.S. PATENT DOCUMENTS

| | | | |
|---|---|---|---|
| 4,157,572 | 6/1979 | Kennedy et al. | 358/111 |
| 4,459,990 | 7/1984 | Barnea | 128/654 |
| 4,503,459 | 3/1985 | Haendle et al. | 128/653 R |
| 4,503,461 | 3/1985 | Nishimura | 128/653 R |
| 4,618,990 | 10/1986 | Sieb, Jr. et al. | 332/22 |
| 4,843,629 | 6/1989 | Mischler et al. | 332/6 |
| 4,878,115 | 10/1989 | Elion | 358/111 |

OTHER PUBLICATIONS

Kin et al., "Multiwavelength Feature Detection and Recognition", SPIE, vol. 178, Smart Sensors, pp. 142-153 (1979).
Kaneko et al., "Straight-Line Approximation", Trans on Bio Eng., vol. BME-20, No. 6, pp. 413-416 (1973).
Couturier, "Sobel Edge Extraction Circuit", Air Force Wright Aeronautical Laboratories (1981).

*Primary Examiner*—Lee S. Cohen
*Assistant Examiner*—John D. Zele
*Attorney, Agent, or Firm*—Oblon, Spivak, McClelland, Maier & Neustadt

[57] ABSTRACT

A digital mask image is obtained by emitting radiation onto a subject before a contrast medium is injected in a blood vessel, and digital mask image data corresponding to the mask image is stored in a first image memory. A digital contrast image is obtained by emitting radiation to the subject after the contrast medium is injected in the blood vessel, and contrast image data corresponding to the contrast image is stored in a second image memory. The mask image data is read out from the first image memory and the contrast image data is read out from the second image memory. Then, the mask image data is subtracted from the contrast image data by a subtraction circuit, thus obtaining angiographical image data. Edges of the blood vessel are detected from the angiographical image data by an edge detecting circuit. Edge image data corresponding to the detected edges is added to the fluoroscopic image data by a summing circuit, thus obtaining a road map image including a contour of the blood vessel and the fluoroscopic image. The road map image is displayed on a TV monitor.

15 Claims, 9 Drawing Sheets

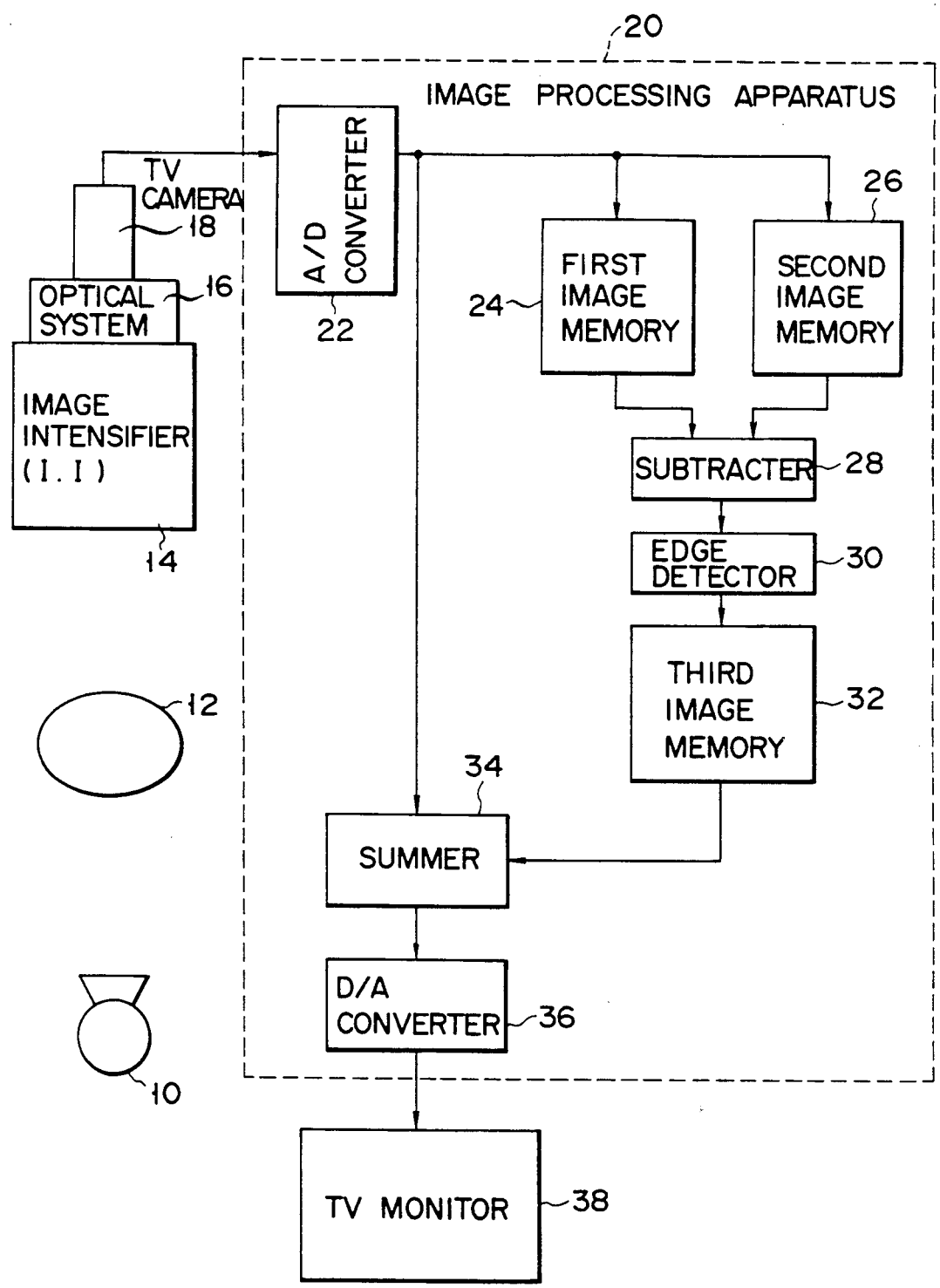
F I G. 1

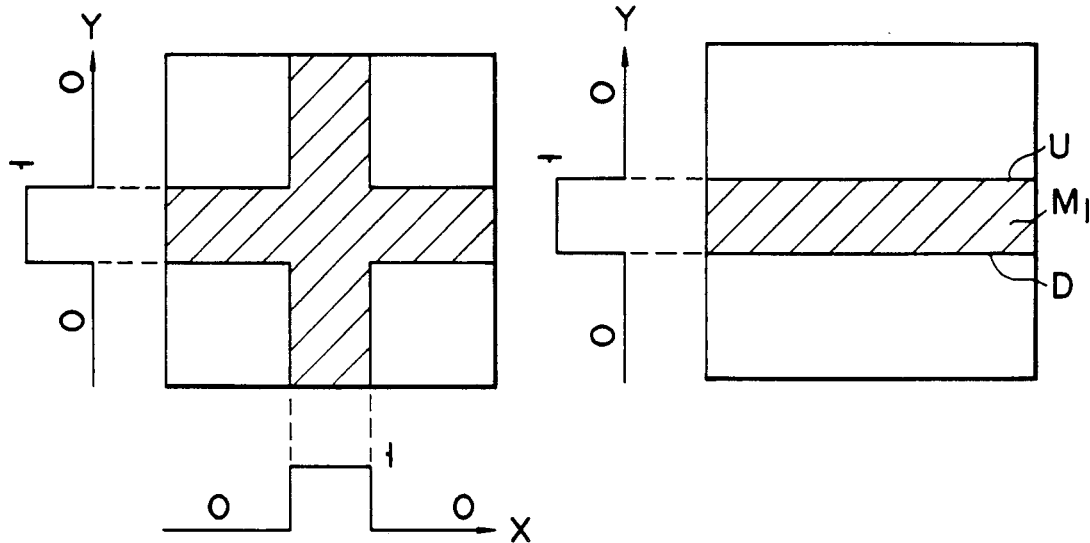
F I G. 2A   F I G. 2B
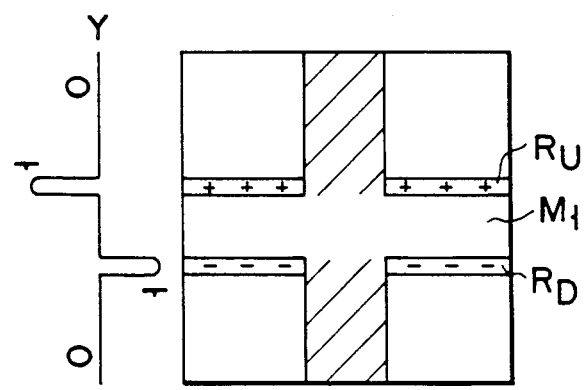
F I G. 2C   F I G. 2D

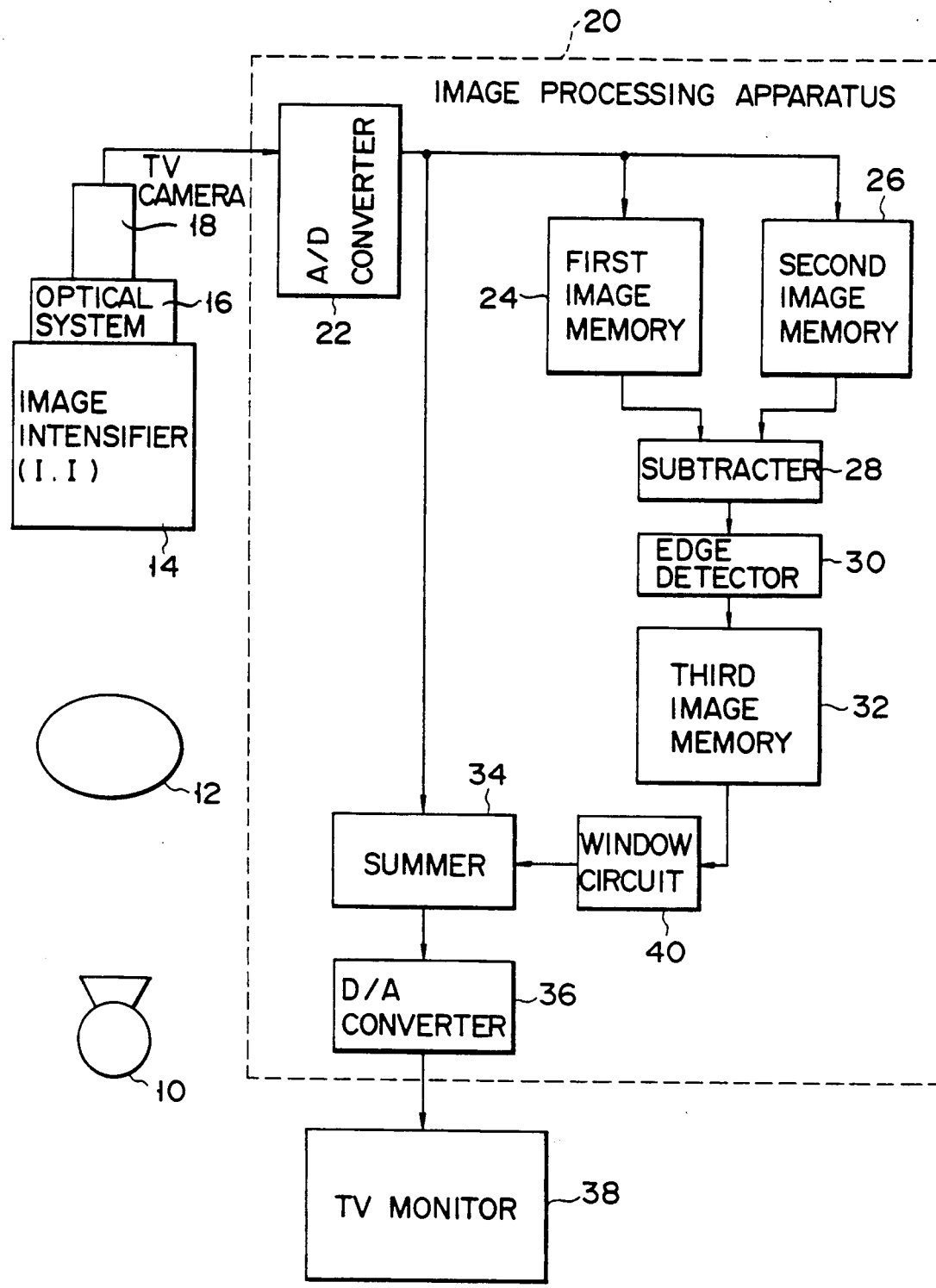
F I G. 4

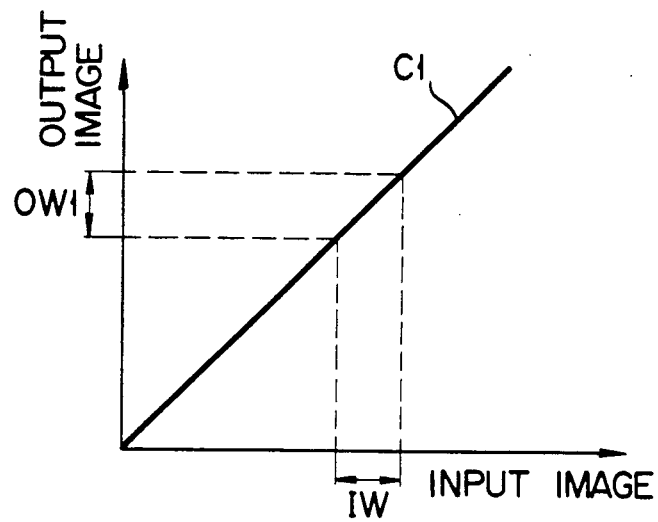
F I G. 5A
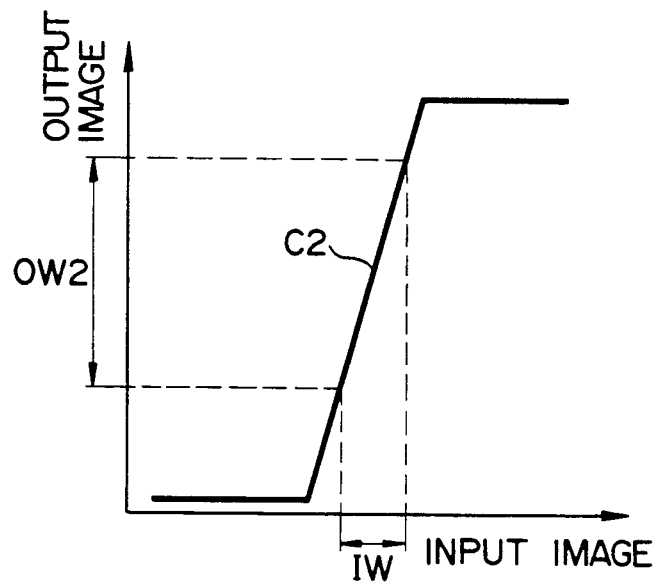
F I G. 5B
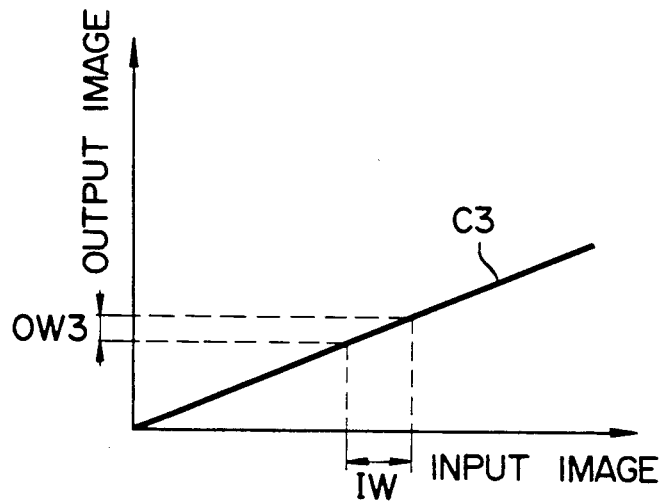
F I G. 5C

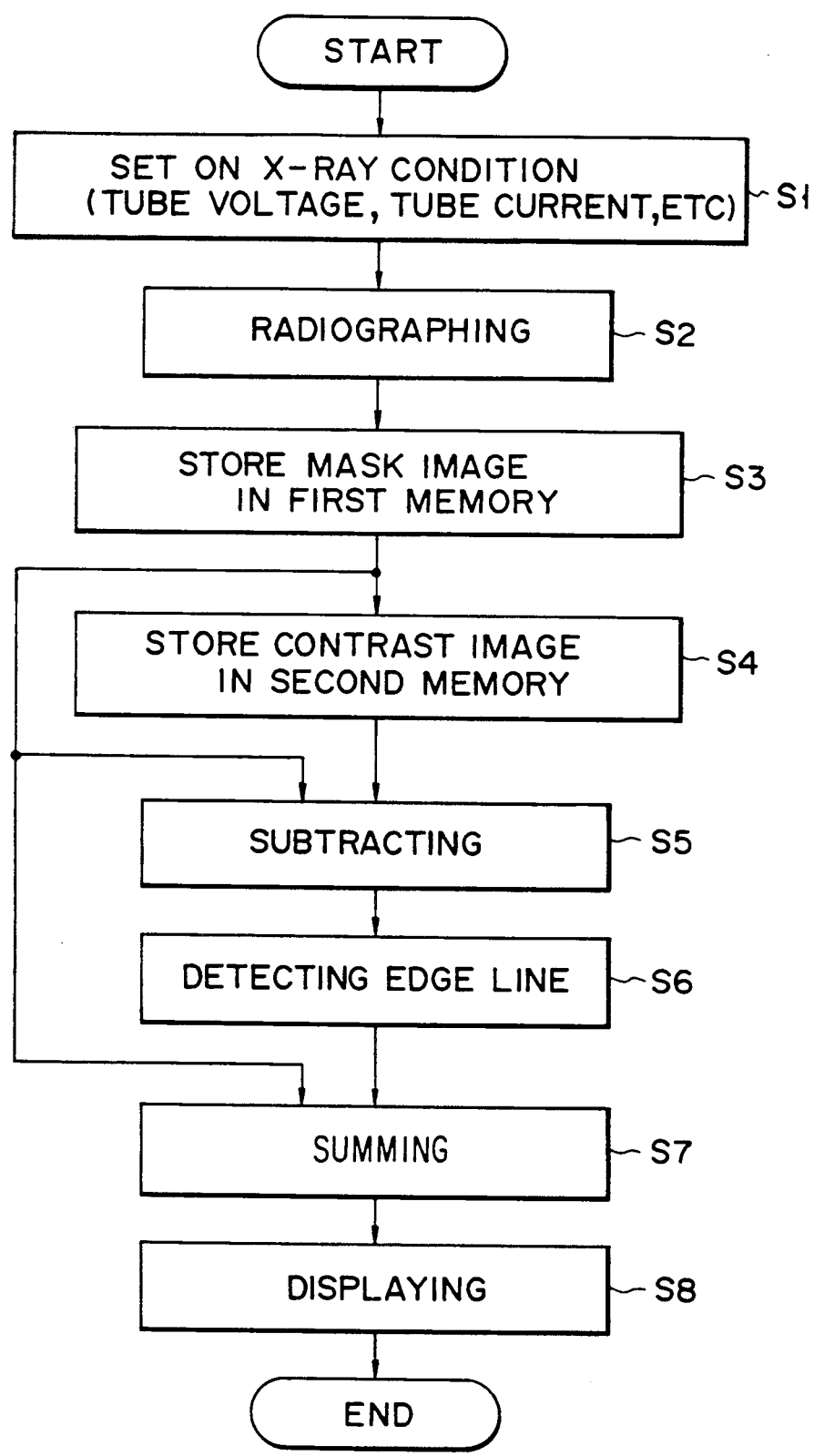
F I G. 7

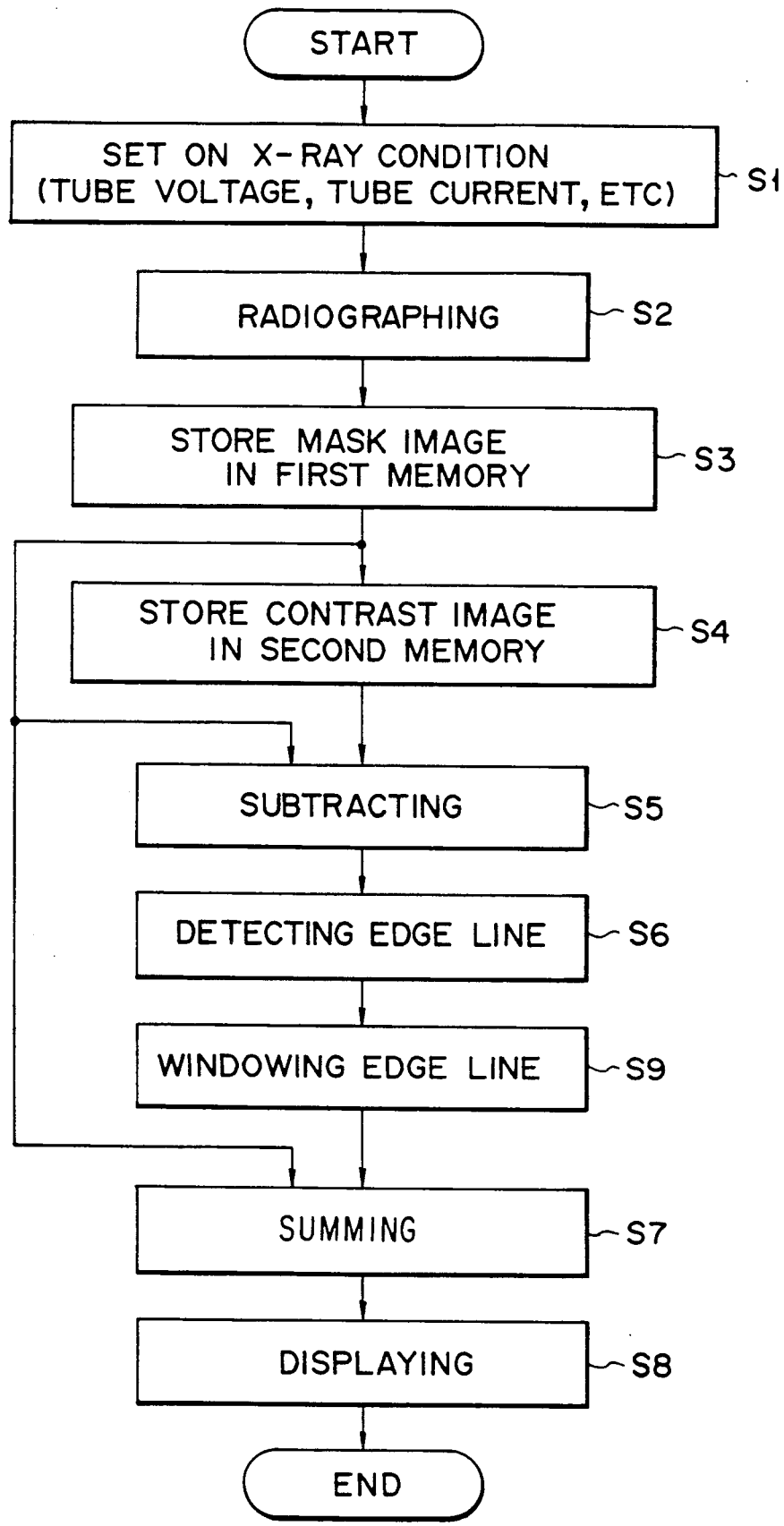
F I G. 8

IMAGE PROCESSING METHOD AND SYSTEM FOR RADIOLOGICAL DIAGNOSTICS

BACKGROUND OF THE INVENTION

1. Field of the Invention

The present invention relates generally to an image processing method and system for an X-ray apparatus for diagnosis of a circulatory organ, and more specifically to an image processing method and system for obtaining a road map as assisting means for guiding, in particular, a catheter to a target region in a subject.

2. Description of the Related Art

The road map image can be produced through the following image processing.

An operator inserts and advances a catheter to a target region in a blood vessel of a subject. While watching a fluoroscopic image displayed on a TV monitor, the operator advances the catheter into the blood vessel. In prior art devices, however, the blood vessel is not shown on the fluoroscopic image. Thus, it is difficult for the operator to decide in which direction the catheter should advance. To solve this problem, a contrast medium is often injected into the blood vessel from an end portion of the catheter, thus confirming the advancement of the catheter in the blood vessel.

Under the circumstances, a road map method is employed as an assisting method. In the road map method, an image of the blood vessel is superposed on the fluoroscopic image. More specifically, the contrast medium is injected into the blood vessel to obtain an image of the blood vessel through which the catheter will advance. Then, a mask image obtained before the contrast medium is injected is subtracted from a resulting contrast image. In a resulting subtraction image, a background (skeleton and/or muscle) is erased, and only an image of the blood vessel is displayed. Further, the image of the blood vessel is added to the fluoroscopic image. Namely, the image of the blood vessel and the fluoroscopic image are superposed on each other, thereby obtaining a road map image in which the blood vessel is shown on the fluoroscopic image. Consequently, the catheter can be easily advanced in a desired direction by referring to the road map image, and therefore the catheter can be easily operated.

The conventional road mapping, however, has the following problem.

Since the image of the blood vessel is superposed on the fluoroscopic image, that portion of the fluoroscopic image which corresponds to the blood vessel is not clearly seen. In particular, the direction of the tip portion of the catheter is very important when the catheter is operated in a branched region of the blood vessel. Thus, it is necessary that the image of the blood vessel be seen clearly. However, the image of the blood vessel, which is overlapped with the fluoroscopic image, becomes difficult to see.

SUMMARY OF THE INVENTION

The object of the present invention is to provide an image processing method and system, whereby a road map image for facilitating observation of a catheter inserted into the blood vessel can be obtained, and the operator's work load can be reduced.

According to one aspect of the present invention, there is provided an image processing system for radiological diagnostics, with use of a mask image obtained by emitting radiation to a subject before a contrast medium is injected in a blood vessel, and a contrast image obtained by emitting radiation to the subject after the contrast medium is injected in the blood vessel, the system comprising: an image data output circuit for converting the mask image and the contrast image to mask image data and contrast image data, respectively; a subtraction circuit, connected to the image data output circuit, for subjecting the mask image data and the contrast image data to a subtraction operation, thus obtaining subtraction image data corresponding to the blood vessel; an edge detection circuit, connected to the subtraction circuit, for detecting edge image data corresponding to edges of the blood vessel, on the basis of the subtraction image data output from the subtraction circuit; and a summing circuit, connected to the image data output circuit and the edge detection circuit, for summing the fluoroscopic image data and the edge image data, thus forming road map image data corresponding to a road map image including a contour of the blood vessel and the fluoroscopic image.

According to another aspect of the invention, there is provided an image processing system for radiological diagnostics, with use of a mask image obtained by emitting radiation to a subject before a contrast medium is injected in a blood vessel, and a contrast image obtained by emitting radiation to the subject after the contrast medium is injected in the blood vessel, the system comprising: an image data output circuit for converting the mask image and the contrast image to mask image data and contrast image data, respectively; a first memory circuit, connected to the image data output circuit, for storing the mask image data; a second memory circuit, connected to the image data output circuit, for storing the contrast image data; a subtraction circuit, connected to the first and second memory circuits, for subjecting the mask image data and the contrast image data read out from the first and second memory circuits to a subtraction operation, thus obtaining subtraction image data corresponding to the blood vessel; an edge detection circuit, connected to the subtraction circuit, for detecting edge image data corresponding to edges of the blood vessel, on the basis of the subtraction image data output from the subtraction circuit; an emphasizing circuit, connected to the edge detection circuit, for emphasizing the edge image data, thus outputting emphasis edge image data; and a summing circuit, connected to the image data output circuit and the emphasizing circuit, for summing the fluoroscopic image data and the edge image data, thus forming road map image data corresponding to a road map image including a contour of the blood vessel and the fluoroscopic image.

According to still another aspect of the invention, there is provided an image processing method for radiological diagnostics, with use of a mask image obtained by emitting radiation to a subject before a contrast medium is injected in a blood vessel, and a contract image obtained by emitting radiation to the subject after the contrast medium is injected in the blood vessel, the method comprising: a first step of converting the mask image and the contract image to mask image data and contrast image data, respectively; a second step of subjecting the mask image data and the contrast image data to a subtraction operation, thus obtaining subtraction image data corresponding to the blood vessel; a third step of detecting edge image data corresponding to edges of the blood vessel, on the basis of the subtraction image data; and a fourth step of summing the fluoroscopic image data and the edge image data, thus forming road map image data corresponding to a road map image including a contour of the blood vessel and the fluoroscopic image.

According to the above systems and method, only edges of the blood vessel can be detected by the edge detecting circuit, on the basis of the angiographical image obtained through the subtraction operation. Thus, only an edge image (contour image) of the blood vessel, wherein an image of the inside of the blood vessel has been deleted, can be obtained. When the edge image and the fluoroscopic image are superposed on each other, the fluoroscopic image and the catheter are displayed in the inside region of the blood vessel. Therefore, the fluoroscopic image and the catheter in the inside region of the blood vessel become easily recognizable, and the operator can easily operate the catheter. Consequently, the operator's work load can be reduced.

BRIEF DESCRIPTION OF THE DRAWINGS

FIG. 1 is a block diagram of an image processing system for radiological diagnostics according to one embodiment of the present invention;

FIGS. 2A to 2H illustrate a Sobel filter in detail;

FIG. 4 is a block diagram of an image processing system for radiological diagnostics according to another embodiment of the invention;

FIGS. 5A to 5C are graphs showing characteristics of a window circuit;

FIG. 7 is a flowchart for explaining an image processing method for radiological diagnostics according to the present invention; and FIG. 8 is a flowchart for explaining a modification of the method shown in FIG. 7.

DETAILED DESCRIPTION OF THE PREFERRED EMBODIMENTS

Figure 2E:
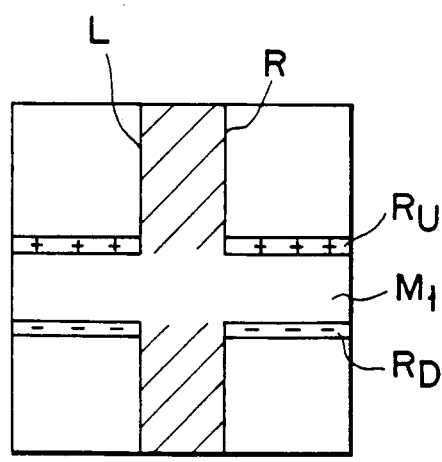

FIG. 1 is a block diagram of an image processing system for radiological diagnostics according to one embodiment of the present invention. In FIG. 1, an X-ray tube 10, which is typical as a radiation generating means, irradiates X-rays onto a subject 12. An image intensifier 14, serving as a detector, detects the X-rays transmitted through the subject 12, and converts the X-rays to an optical image. A TV camera 18 converts the optical image supplied from the image intensifier 14 to a TV image signal through an optical system 16 such as a lens.

An image processing apparatus 20 processes the TV image signal input from the TV camera 18. A structure of the image processing apparatus 20 will now be described.

An analog/digital converter (A/D converter) 22 is connected to the TV camera 18 and converts the analog TV image signal to a digital TV image signal. An output terminal of the A/D converter 22 is connected to first and second image memories 24 and 26. The first memory 24 stores digital mask image data obtained from the A/D converter 22 in the state wherein a contrast medium is not injected into the subject 12. The second image memory 26 stores digital contrast image data obtained from the A/D converter 22 in the state wherein the contrast medium is injected into the subject 12. Readout terminals of the first and second image memories 24 and 26 are connected to a subtracter 28. The subtracter 28 subtracts the mask image data input from the first image memory 24 from the contrast image data input from the second image memory 26, thereby outputting subtraction image data, i.e., angiographical data.

An output terminal of the subtracter 28 is connected to an edge detector 30. The edge detector 30 detects only that portion of the angiographical data input from the subtracter 28, which corresponds to an edge of a blood vessel. Also, the edge detector 30 subjects the angiographical data to a digital differential arithmetic operation in units of a pixel group. For example, a conventionally known Sobel filter is used as the edge detector 30. The Sobel filter processes data of a static angiographical image.

The Sobel filter will now be described with reference to FIG. 2. The Sobel filter is a digital filter consisting of, for example, 3×3 templates. More specifically, a pixel value of each pixel group of the angiographical image is subjected to a Y-directional differential and a X-directional differential by using the 3×3 templates. Thus, the obtained image is expressed by absolute values.

Figure 2F:
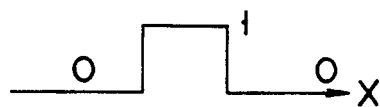

FIG. 2A shows an example of an image to be subjected to the edge detection by the Sobel filter. A region of the image to be detected is indicated by a cross-shaped hatched portion, and this region has a pixel value of, e.g., "1". In this case, a pixel value of the background is "0". When the image is subjected to the Y-directional differential, as shown in FIG. 2B, a 3×3 Sobel filter shown in FIG. 2C is employed. On the other hand, when the image is subjected to the X-directional differential, as shown in FIG. 2E, a 3×3 Sobel filter shown in FIG. 2F is employed.

An output terminal of the edge detector 30 is connected to a third image memory 32. The third image memory 32 stores edge image data input from the edge detector 30. A readout terminal of the third image memory 32 is connected to a summer 34, and also the output terminal of A/D converter 22 is connected to the summer 34. The summer 34 sums the edge image data input from the third image memory 32 and the fluoroscopic image data input from the A/D converter 22, thereby outputting sum data. In other words, the summer 34 forms a road map image in which the edge image and the fluoroscopic image are superposed on each other. An output terminal of the summer 34 is connected to a D/A converter 36. The D/A converter 36 converts digital road map image data to analog road map image data. An output terminal of the D/A converter 36 is connected to a TV monitor 38. The TV monitor 38 displays the analog road map image data as a road map image.

An operation of the above embodiment will now be described.

X-rays irradiated from the X-ray tube 10 is transmitted through the subject 12. The transmitted X-rays are converted to an optical image by the image intensifier 14. The optical image is converted to a TV image signal by the TV camera 18. The TV image signal is input to the image processing apparatus. In the image processing apparatus, the TV image signal is first converted to digital mask image data by the A/D converter 22.

Image data, which corresponds to a mask image obtained before a contrast medium is injected into the blood vessel of the subject 12, is stored in the first image memory 24. On the other hand, image data, which corresponds to a contrast image obtained after the contract medium is injected into the blood vessel of the subject 12, is stored in the second image memory 26. The mask image data read out from the first image memory 24 and the contrast image data read out from the second image memory 26 are input to the subtracter 28. The subtracter 28 then outputs subtraction image data. In other words, the subtracter 28 outputs a subtraction image in which the mask image is subtracted from the contrast image, that is, image data corresponding to an angiographical image of only that portion of the blood vessel in which the contrast medium has been injected. Then, the edge detector 30 detects the edge of the blood vessel by using the Sobel filter shown in FIGS. 2A and 2F. Angiographical image data shown in FIG. 2A is subjected t Y-directional differential by using the Sobel filter shown in FIG. 2C. Namely, pixel values (e.g., "1", "0"), as shown in FIG. 2B, of each pixel group of the angiographical image are differentiated in the following manner:

1) When pixel values of an angiographical image extending in the X-direction are differentiated by the 3×3 Sobel filter, with a background "0" near an upper edge U of the image being set as a center region of differential, a pixel value of a region $R_U$ of the angiographical image near the upper edge U is expressed by $$-1 \times "0" + 0 \times "0" + 1 \times "1"$$
$$-2 \times "0" + 0 \times "0" + 2 \times "1" +$$
$$-1 \times "0" + 0 \times "0" + 1 \times "1" = +4$$

Namely, the pixel value of the region RU becomes a positive (+) value, as shown in FIG. 2D.

2) When pixel values are differentiated by the 3×3 Sobel filter, with an inner region M1 being set as a center of differential, a pixel value of the region M1 is represented by $$-1 \times 1 + 0 \times "1" + 1 \times "1"$$
$$-2 \times "1" + 0 \times "1" + 2 \times 37 \ 1" + 0$$
$$-1 \times "1" + 0 \times "1" + 1 \times "1" = 0$$

Thus, the pixel value of the inner region M1 becomes 0, as shown in FIG. 2D, and the image of the inside of the blood vessel is deleted.

3) When pixel values are differentiated by the 3×3 Sobel filter, with a background "0" near a lower edge D of the image being set as a center region of differential, a pixel value of a region $R_D$ near the lower edge D is represented by $$-1 \times "1" + 0 \times "0" + 1 \times "0"$$
$$-2 \times "1" + 0 \times "0" + 2 \times "0"$$
$$-1 \times "1" + 0 \times "0" + 1 \times "0" = -4$$

Namely, the pixel value of the region $R_D$ has a negative (−) value, as shown in FIG. 2D.

As shown in FIG. 2D, only the regions $R_U$ and $R_D$ extending in the X-direction are detected as the upper and lower edges of the blood vessel, and the image of the inner region M1 of the blood vessel is deleted. If the regions of the image, excluding the upper and lower edges and the inner region M1, are differentiated by using the same Sobel filter, the pixel values of those regions all become 0.

Next, angiographical image data is subjected to X-directional differential, as shown in FIG. 2E, by using a 3×3 Sobel filter shown in FIG. 2F.

4) When pixel values of an angiographical image extending in the Y-direction are differentiated by the 3×3 Sobel filter, with a background "0" near a left edge L of the image being set as a center region of differential, a pixel value of a region $R_L$ of the angiographical image near the left edge L is expressed by $$-1 \times "0" + -2 \times "0" + -1 \times "0"$$
$$0 \times "0" + 0 + "0" + 0 \times "0"$$
$$1 \times "1" + 2 \times "1" + 1 \times "1" = +4$$

Figure 2G:
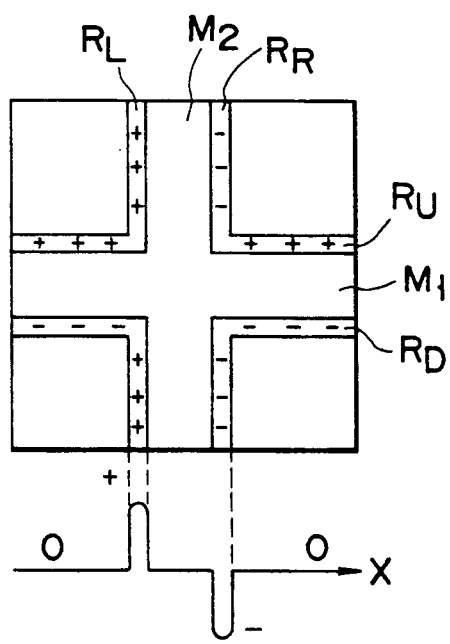

Namely, the pixel value of the region $R_L$ becomes a positive (+) value, as shown in FIG. 2G.

5) When pixel values are differentiated by the 3×3 Sobel filter, with an inner region M2 being set as a center of differential, a pixel value of the region M2 is represented by $$1 \times "1" + -2 \times "1" + -1 \times "1" = 0$$
$$0 \times "1" + 0 \times "1" + 0 \times "1" = 0$$
$$1 \times "1" + 2 \times "1" + 1 \times "1"$$

Thus, the pixel value of the inner region M2 becomes 0, as shown in FIG. 2G, and the image of the inside of the blood vessel is deleted.

6) When pixel values are differentiated by the 3×3 Sobel filter, with a background "0" near a right edge R of the image being set as a center region of differential, a pixel value of a region $R_R$ near the right edge R is represented by $$1 \times "1" + -2 \times "1" + -1 \times "1"$$
$$0 \times "0" + 0 \times "0" + 0 \times "0"$$
$$1 \times "0" + 2 \times "0" + 1 \times "0" = -4$$

Namely, the pixel value of the region $R_R$ has a negative (−) value, as shown in FIG. 2G.

Figure 2H:
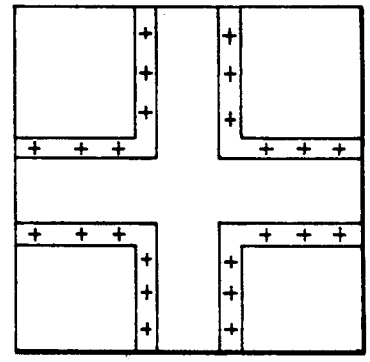

As shown in FIG. 2G, only the regions $R_L$ and $R_R$ extending in the Y-direction are detected as the left and right edges of the blood vessel, and the image of the inner region M2 of the blood vessel is deleted. If the regions of the image, excluding the left and right edges and the inner region M2, are differentiated by using the same Sobel filter, the pixel values of those regions all become all 0. Further, if the edge image data obtained by the Sobel filter is expressed by absolute values, an edge image as shown in FIG. 2H having positive values can be obtained.

Figure 3:
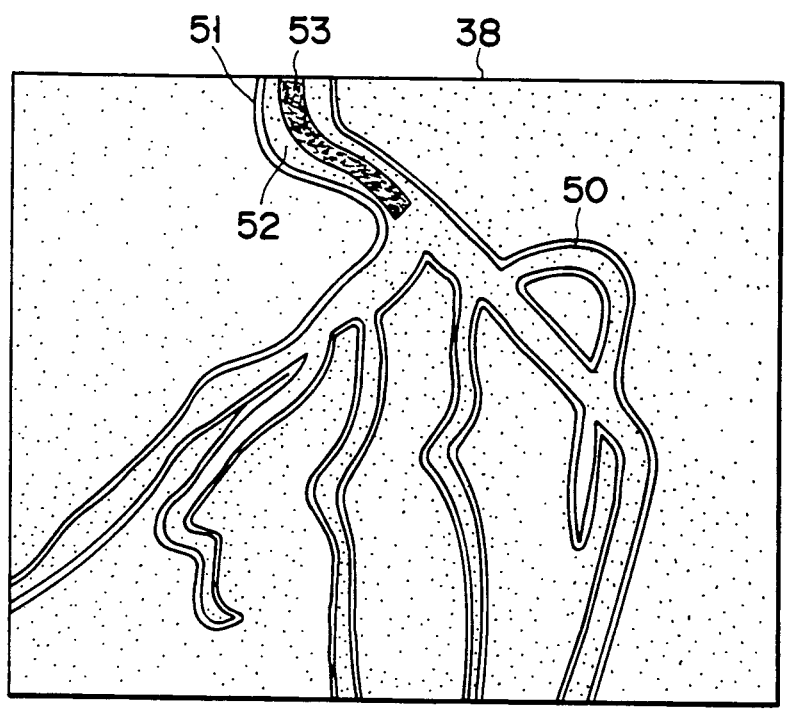
FIG. 3 shows a road map image obtained by the Sobel filter.

The Sobel filter capable of detecting the edges of the angiographical image is applied to an image of finely branched blood vessel. Only the edges of the angiographical image are detected by the Sobel filter, and the edge image data is stored in the third image memory 32. The summer 34 sums the edge image data and the fluoroscopic image data supplied from the A/D converter 22. Thus, a road map image in which only the edge image is superposed on the fluoroscopic image can be obtained, as shown in FIG. 3.

In the obtained road map image, a blood vessel edge portion 51 is displayed as having a certain width, in relation to a blood vessel 50. Thus, the location and presence of the blood vessel is easily recognizable. In addition, no angiographical image is displayed in an inner region 52 of the blood vessel. Thus, the fluoroscopic image and a catheter 53, which are present in the inner region 52, can be clearly seen. Consequently, the operator can easily operate the catheter, and his work can be relaxed. Though the edge image obtained by the Sobel filter may become discontinuous, the object of the road mapping can be fully achieved.

The present invention is not limited to the above embodiment. For example, in addition to the edge detector for detecting the edges of an angiographical image, means for emphasizing the edge image obtained by the edge detector may be provided, thereby obtaining a more excellent edge image. A system including such means is shown in FIG. 4. Namely, the system shown in FIG. 4 includes a window circuit 40 at the rear stage of the third image memory shown in FIG. 1.

FIG. 5 shows examples of window characteristics attained by the window circuit 40. The window circuit 40 emphasizes or weakens an edge image of a blood vessel which is to be superposed on a fluoroscopic image. In the case of a window characteristic C1 shown in FIG. 5A, an edge image region of the blood vessel (i.e., input window IW) is converted to an output window OW1. On the other hand, in the case of a window characteristic C2, the input window IW is converted to an output window OW2. Thus, the edge image of the blood vessel is emphasized. In the case of a window characteristic C3, since the input window IW is converted to an output window OW3, the edge image of the blood vessel is weakened.

In the present embodiment, the edge image is emphasized by the window circuit 40, with use of the window characteristic C2 shown in FIG. 5B.

Figure 6A:
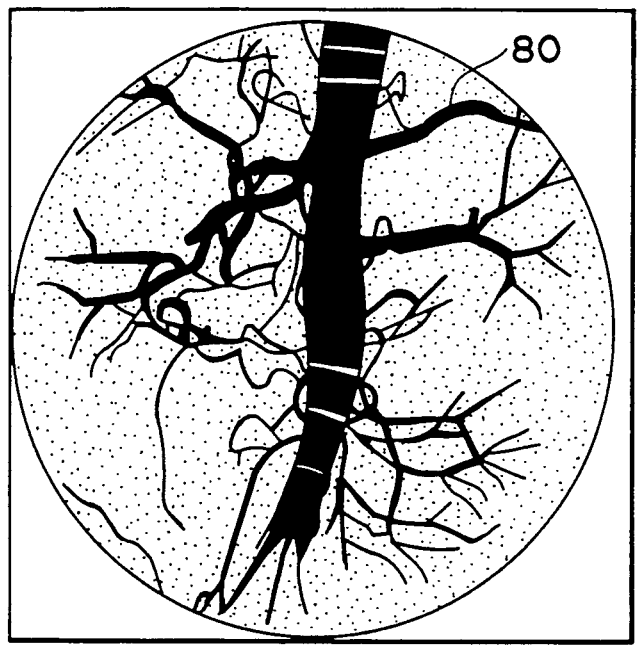
FIGS. 6A and 6B show a road map image obtained by the window circuit and the Sobel filter.
Figure 6B:
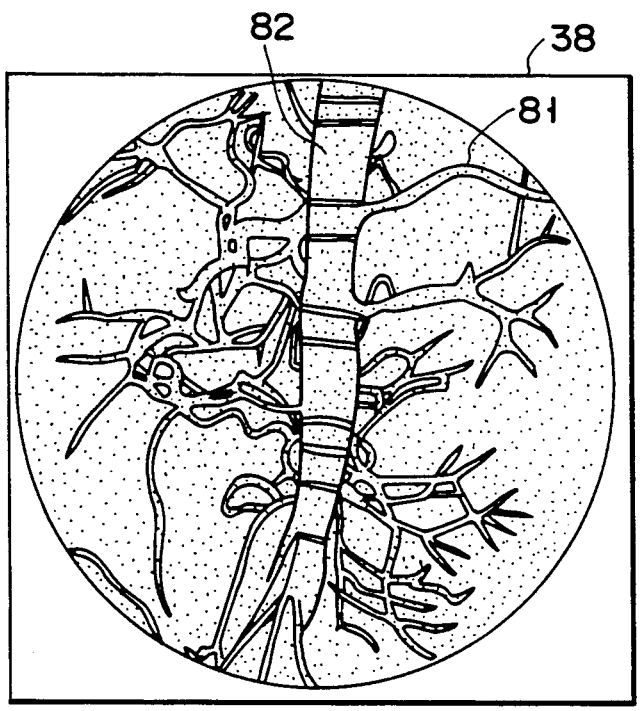

Edge emphasis image data output from the window circuit 40 and the fluoroscopic image data are summed by the summer 34. Consequently, for example, an angiographical image 80 shown in FIG. 6A is emphasized with respect to only an edge 81 of the blood vessel. Thus, the edge 81 and an inner region 82 can be seen more clearly.

FIG. 7 is a flowchart for explaining an image processing method for radiological diagnostics according to the present invention. First, X-ray conditions (XRC), such as tube voltage and tube current, are set (step S1). In step S2, an X-ray image is photographed. In step S3, digital mask image data is obtained and stored in a first image memory. In step S4, digital contrast image data is obtained and stored in a second image memory. In step S5, the contrast image data and the mask image data are subjected to subtraction, thereby producing an angiographical image. In step S6, only an edge image in the angiographical image is detected. In step S7, the data of the edge image is added or summed to the fluoroscopic image data.

The resulting edge image may be emphasized in a subsequent process, in order to make a clearer edge image. This emphasis process illustrated in FIG. 8. This process includes a step S9 for emphasizing the edge image after the step S6 for detecting the edge in the angiographical image. As a result, a clearer image can be obtained, then in the method shown in FIG. 7.

Of course, other various changes and modifications may be made to the present invention, within the scope of the subject matter of the present invention.

According to the present invention, only a blood vessel edge image can be detected by the detection means from a subtraction angiographical image. Thus, an edge image can be obtained, while an image within the blood vessel can be deleted. By superposing the edge image and the fluoroscopic image on upon each other, an image of a catheter, which is present within the blood vessel, can be clearly observed. The operator, therefore, can operate the catheter, and his work load can be reduced.

What is claimed is:

1. An image processing system for radiological diagnostics, with use of fluoroscopic images, one obtained by emitting radiation to a subject with no contrast medium being in a blood vessel, and another obtained with a contrast medium being in the blood vessel, said system comprising:

image data output means for converting the fluoroscopic images to fluoroscopic image data;

subtraction means, connected to said image data output means, for subjecting to a subtraction operation the fluoroscopic image data regarding the one fluoroscopic image obtained with no contrast medium being in the blood vessel and the fluoroscopic image data regarding said another fluoroscopic image obtained with contrast medium being in the blood vessel, thus obtaining subtraction image data corresponding to the blood vessel;

edge detection means, connected to said subtraction means for detecting edge image data corresponding to edges of the blood vessel, on the basis of the subtraction image data output from the subtraction means; and summing means, connected to the image data output means and the edge detection means, for summing the fluoroscopic image data regarding the one fluoroscopic image obtained with no contrast medium being in the blood vessel and the edge image data, thus forming road map image data corresponding to a road map image including a contour of the blood vessel and the one fluoroscopic image.

2. The system according to claim 1, wherein said subtraction image data consists of a plurality of pixel groups, and said detection means comprises means for subjecting the subtraction image data to a digital differential arithmetic operation in units of a pixel group.

3. The system according to claim 2, wherein each of said pixel groups has at least two pixels.

4. The system according to claim 1, wherein said detection means comprises a Sobel filter.

5. The system according to claim 4, wherein said Sobel filters constituted by 3×3 templates, said Sobel filter differentiates each pixel of said subtraction image data in the Y and X directions by 3×3 groups of pixels corresponding to said 3×3 templates, thereby to obtain edge image data.

6. An image processing system for radiological diagnostics, with use of fluoroscopic images, one obtained by emitting radiation to a subject with no contrast medium being a blood vessel, and another obtained with a contrast medium being in the blood vessel, said system comprising:

image data output means for converting the fluoroscopic images to fluoroscopic image data;

first memory means, connected to said image data output means, for storing the fluoroscopic image data regarding the one fluoroscopic image obtained with no contrast medium being in the blood vessel;

secondary memory means, connected to said image data output means, for storing the fluoroscopic image data regarding said another fluoroscopic image obtained with the contrast medium being in the blood vessel;

subtraction means, connected to said first and second memory means, for subjecting to a subtraction operation the fluoroscopic image data regarding the one fluoroscopic image obtained with no contrast medium being in the blood vessel and the fluoroscopic image data regarding the other fluoroscopic image obtained with the contrast medium being in the blood vessel, read out from the first and second memory means, thus obtaining subtraction image data corresponding to the blood vessel;

edge detection means, connected to said subtraction means, for detecting edge image data corresponding to edges of the blood vessel, on the basis of the subtraction image data output from the subtraction means;

emphasizing means, connected to the edge detection means, for emphasizing the edge image data; and summing means, connected to the image data output means and the emphasizing means, for summing the fluoroscopic image data regarding the one fluoroscopic image obtained with on contrast medium being in a blood vessel and the edge image data, thus forming road map image data corresponding to a road map image including a contour of the blood vessel and the one fluoroscopic image.

7. The system according to claim 6, wherein said subtraction image data consists of a plurality of pixel groups, and said detection means comprises means for subjecting the subtraction image data to a digital differential arithmetic operation in units of a pixel group.

8. The system according to claim 7 wherein each of said pixel groups has at least two pixels.

9. The system according to claim 6, wherein said detection means comprises a Sobel filter.

10. The system according to claim 9, wherein said Sobel filter is constituted by 3×3 templates, said Sobel filter differentiates each pixel of said subtraction image data in the Y and X directions by 3×3 groups of pixels corresponding to said 3×3 templates, thereby to obtain edge image data.

11. An image processing method for radiological diagnostics, with use of fluoroscopic images, one obtained by emitting radiation to a subject with no contrast medium being in a blood vessel, and another obtained with a contrast medium being in the blood vessel, said method comprising:

a first step of converting the fluoroscopic images to fluoroscopic image data;

a second step of subjecting to a subtraction operation the fluoroscopic image data regarding the one fluoroscopic image obtained with no contrast medium being in the blood vessel and the fluoroscopic image data regarding said another fluoroscopic image obtained with the contrast medium being in the blood vessel, thus obtaining subtraction image data corresponding to the blood vessel;

a third step of detecting edge image data corresponding to edges of the blood vessel, on the basis of the subtraction image data; and a fourth step of summing the fluoroscopic image data regarding the one fluoroscopic image obtained with no contrast medium in a blood vessel and the edge image, thus forming road map image data corresponding to a road map including a contour of the blood vessel and the one fluoroscopic image.

12. The method according to claim 11, wherein said subtraction image data consists of a plurality of pixel groups, and the detection in said third step is performed by subjecting the subtraction image data to a digital differential arithmetic operation in units of a pixel group.

13. The method according to claim 12, wherein each of said pixel groups has at least two pixels.

14. The method according to claim 11, wherein the detection in said third step is performed by using a Sobel filter.

15. The method according to claim 14, wherein said Sobel filter is constituted by 3×3 templates, said Sobel filter differentiates each pixel of said subtraction image data in the Y and X directions by 3×3 groups of pixels corresponding to said 3×3 templates, thereby to obtain edge image data.

* * * * *